June 18, 1940. A. F. WILLS 2,205,328
EXTRUDING MACHINE FOR CLAY, SOAP, AND OTHER PLASTIC MATERIALS
Filed Feb. 14, 1939
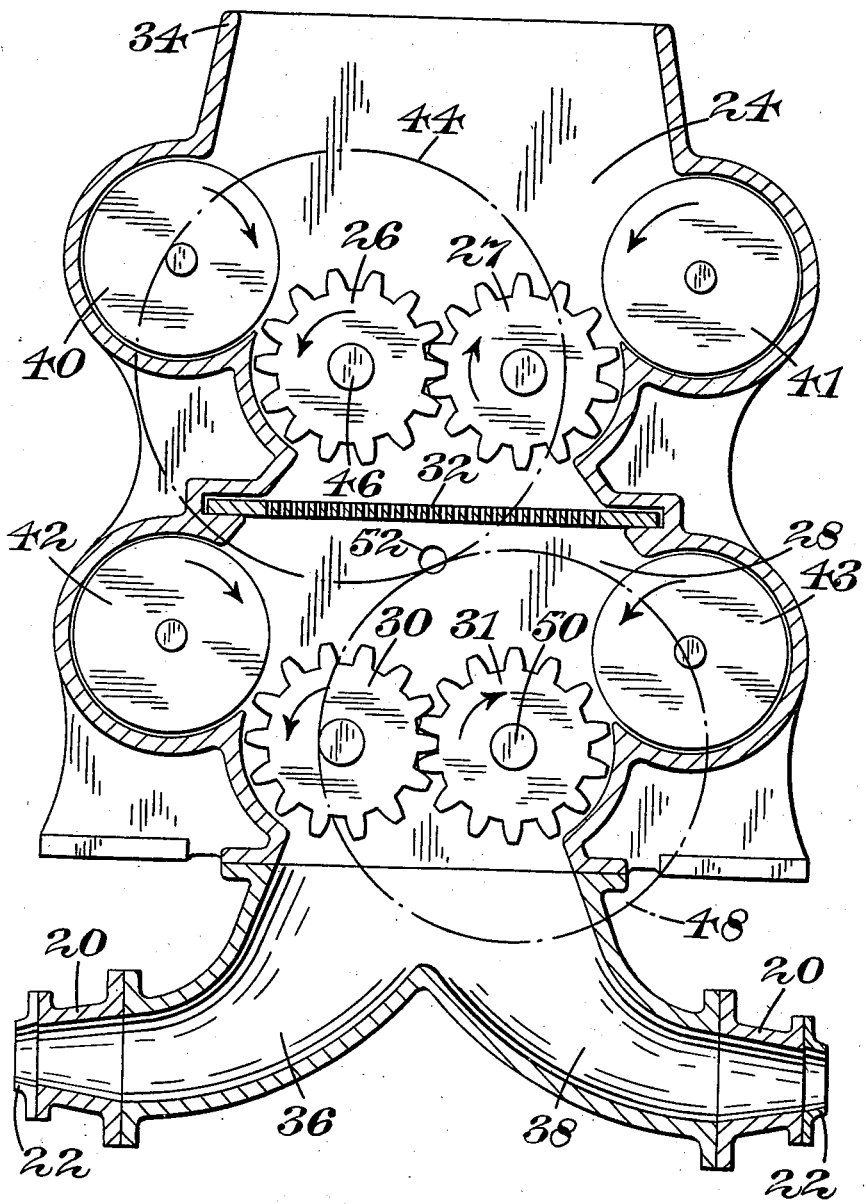
INVENTOR
ARNOLD FRANK WILLS
ATTORNEYS Patented June 18, 1940

2,205,328

UNITED STATES PATENT OFFICE 2,205,328

EXTRUDING MACHINE FOR CLAY, SOAP, AND OTHER PLASTIC MATERIALS

Arnold Frank Wills, Burnham-on-Sea, England, assignor to W. & F. Wills, Limited, Bridgwater, England, a British company Application February 14, 1939, Serial No. 256,323
In Great Britain April 13, 1938

2 Claims. (Cl. 25—11)

This invention relates to extruding machines of the type (hereinafter referred to as the type described) wherein a chamber to receive plastic material contains rotary expelling means for forcing the material through an outlet having a die for giving the extruded material the required shape as to its cross-sectional area. The expelling means comprises a pair of intermeshing toothed wheels situated in a part of the chamber having opposite arcuate walls that are of a curvature struck respectively from the axes of rotation of the wheels and that lie adjacent to the peripheries of the wheels. The machine is particularly applicable for dealing with plastic clay, but it is not restricted thereto, as it can also be used for the extrusion of other plastic materials, such as soap, the contents of sausages, butter and the like.

In one construction of machine of the type described proposed heretofore, the pair of toothed wheels was situated in an 8-shaped chamber and the wheels were so shaped as to provide an extrusion opening between them, to which strips of plastic rubber were fed by a pair of feed rolls, the direction of rotation of the toothed wheels being such that the plastic material was carried around their periphery to nip of the wheels, i. e., the point at which the teeth interlock. In another proposed construction of machine of the type described, a spiral conveyor was provided for feeding the plastic material to the pair of toothed wheels, but in neither of these proposed machines was any provision made for de-airing the plastic material.

In extrusion machines of a type different from that to which the present invention relates, it has, however, been proposed to force the plastic material through a grid to a conveyor in the form of an auger which expelled it through the outlet, provision being made by means of a suction pipe to evacuate the air from the plastic material as it was being discharged through the grid. In one of these proposed machines a worm conveyor was used for forcing the plastic material through the grid and in another an oscillatory plunger was used for that purpose. When a worm or screw feed is employed for feeding the plastic material either to the extruding chamber of the die, or within that chamber, the pressure on the plastic material cannot be made to exceed a certain amount because, above that maximum, the plastic material will rotate with the screw or worm and will not be fed forwardly, so that the degree of pressure that can be exerted on the plastic material for forcing it through the die is limited.

The present invention has for one of its objects to provide an improved construction of extruding machine of the type described, in which the plastic material can be de-aired and yet can be subjected to high pressure for extruding it through the die.

In the accompanying drawing I have illustrated a present preferred embodiment of my invention. The drawing shows an upper chamber 24 containing a pair of gear wheels 26, 27 is arranged in superposed relation to a lower chamber 28 containing a pair of gear wheels 30, 31, with a grid 32 between the two chambers. The upper chamber 24 has an inlet 34 for plastic material, and the lower chamber 28 has two discharge portions 36, 38, each provided with a die 20 and smoother 22.

Each of the pairs of wheels 26, 27 and 30, 31 is arranged and operates as described above with reference to the pair 14, 15 shown in Figure 1, but in this construction feed means is arranged to assist in feeding material to both pairs of wheels, as it is found that with some materials, difficulty is caused owing to their clinging to the walls of the chamber. As illustrated, this feed means comprises two pairs of feed rollers 40, 41 and 42, 43, respectively, associated with the two pairs of wheels 26, 27 and 30, 31. These rollers have plain peripheries, and each is accommodated in an arcuate or concave portion of the wall of the chamber containing it and lies adjacent to one of the toothed wheels at the side thereof remote from the outlets. The toothed wheels may be driven in any convenient manner, for example by means of a driving wheel 44 indicated in broken lines on the axle 46 of the wheel 26, which wheel 44 meshes with a companion wheel 48 indicated in broken lines on the axle 50 of the toothed wheel 31. The feed rollers may be free to rotate about their axes, or, alternatively, they may be driven in any convenient manner, as by gearing operatively connected with the driving wheels 44 and 48.

In order to remove air or other gas from the material forced by the upper pair of wheels through the grid 32, the upper part of the lower chamber 28 has an outlet or port 52 situated below the grid for connection to a vacuum pump or other exhausting device. Such de-airing of the material is of importance in the brick and tile production industry.

In the construction described above, the end faces of the toothed wheels make a snug fit with the adjacent walls of the chamber for preventing the material from escaping along those walls instead of by way of the wheel teeth and arcuate walls of the chamber.

I claim:

1. An extruding machine of the character described comprising a chamber for receiving plastic material, a grid dividing the chamber into upper and lower compartments, which upper compartment has an inlet, and which lower compartment has an outlet for giving the extruded material the required shape as to its cross-sectional area, and rotary expelling means comprising two pairs of toothed wheels operable in tandem, one pair in each compartment, each of which pairs of wheels is situated in a part of its compartment having opposite concave walls that are of a curvature struck respectively from the axes of rotation of the wheels and that lie adjacent to the peripheries of the wheels, all of which rotate in such a direction that the material above each pair of wheels is driven by their teeth in a direction towards the concave walls around the outside of the wheels and downwards towards the outlet, the wall of which chamber has a port situated under the grid for placing the upper part of the lower compartment into open communication with an exhausting device.

2. An extruding machine of the character described comprising a chamber, a grid dividing the chamber into upper and lower compartments, which upper compartment has at the top a feed inlet for receiving plastic material, and which lower compartment has at the bottom at least one outlet for giving the extruded material the required shape as to its cross-sectional area, rotary expelling means comprising two pairs of intermeshing toothed wheels operable in tandem, one pair in each compartment, the wall of which chamber has a port situated under the grid for placing the upper part of the lower compartment into open communication with an exhausting device, each of which pairs of wheels is situated in a part of its compartment having opposite concave wall-portions that are of a curvature struck respectively from the axes of rotation of the wheels, and that lie adjacent to the peripheries of the wheels, all of which rotate in such a direction that the material above each pair of wheels is driven by their teeth in a direction towards the concave wall-portions, around the outside of the wheels and downwards towards the outlet, and feed means comprising two pairs of feed rollers, one pair in each compartment allotted to the pair of toothed wheels therein, the two feed rollers of each of which pairs are arranged spaced apart towards opposite sides of the allotted pair of intermeshing wheels at the side thereof remote from the outlet.

ARNOLD FRANK WILLS.